BEST AVAILABLE COPY

United States Patent [19] [11] 3,879,572
Shoji et al. [45] Apr. 22, 1975

[54] PRINTED ELECTRIC CIRCUIT CONTAINING POLYBENZIMIDAZOLE PRINTING INK COMPOSITION

[75] Inventors: Magozo Shoji, Kadoma; Tamiharu Noguchi, Neyagawa, both of Japan

[73] Assignee: Matsushita Electric Works, Ltd., Kadoma, Japan

[22] Filed: Sept. 1, 1972

[21] Appl. No.: 285,659

Related U.S. Application Data

[62] Division of Ser. No. 89,342, Nov. 13, 1970, abandoned.

[30] Foreign Application Priority Data

Jan. 21, 1970 Japan .................................. 45-5803

[52] U.S. Cl. ........... 174/68.5; 29/624; 117/161 LN; 117/161 UN; 117/212; 117/226; 117/227

[51] Int. Cl. ............................................. H05k 1/10

[58] Field of Search .......... 252/511; 260/78.4, 72.5, 260/865; 117/212, 218, 161 UA, 216, 226, 217, 227, 161 UN, 161 LN; 317/101 B; 29/624; 174/68.5

[56] References Cited

UNITED STATES PATENTS

| | | | |
|---|---|---|---|
| 3,056,750 | 10/1962 | Pass | 252/511 |
| 3,470,140 | 9/1969 | Salle et al. | 117/161 UA |
| 3,503,929 | 3/1970 | Loudas | 117/161 UA |
| 3,549,468 | 12/1970 | Messineo et al. | 260/78.4 |

*Primary Examiner*—Douglas J. Drummond
*Assistant Examiner*—Jerome W. Massie
*Attorney, Agent, or Firm*—Armstrong, Nikaido & Wegner

[57] ABSTRACT

An improvement in printed electric circuits is provided through the use of an insulative base printed in a predetermined circuit patern with a printing ink composition which includes a polybenzimidazole matrix and an electric resistive or conductive material dispersed therein.

6 Claims, 2 Drawing Figures

PRINTED ELECTRIC CIRCUIT CONTAINING POLYBENZIMIDAZOLE PRINTING INK COMPOSITION

Figure 1:
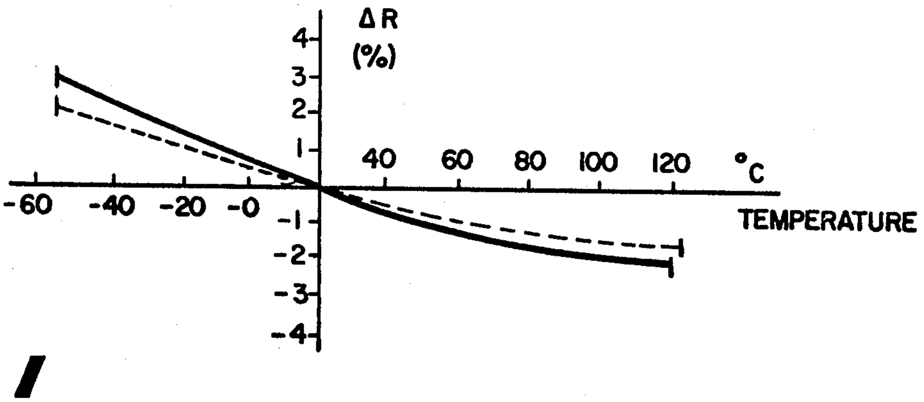

This is a division of application Ser. No. 89,342, filed Nov. 13, 1970, now abandoned.

This invention relates to a printing ink for printed electric circuits and also to a printed circuit made by using such printing ink.

It is known to make an electric resistive or conductive circuit by printing an electric resistive ink or electric conductive ink in a desired pattern on an insulative base and baking the printed ink on the base. It has been conventional to employ a pasty printing ink which comprises low-melting point glass powder, solvent and electric conductive noble metal powder (e.g. gold, silver, etc.) or electric resistive noble metal (and their oxides) powder (e.g. platinum, palladium, etc.). However, such printing ink is required to be heat-treated or baked, after printing, at such a high temperature as 700°–1100°C., so that the base which can be used together with such printing ink is limited to a refractory material (i.e. ceramic). Further, since such high temperature is required, it is impossible to employ a less expensive electric resistive material (e.g. carbon). Further drawback of such printing ink is that a special operation and apparatus are required for conducting such a high temperature treatment. It is also known to use an electric resistive pasty printing ink which comprises powder of carbon (graphite, carbon black, acetylene black, etc.), a synthetic resinous material (e.g. phenolic resin, epoxy resin, etc.) and solvents. In this case, the temperature for baking or heat treatment is low (e.g. about 100°C.) and therefore the resulting electric circuits are unstable in resistivity, which varied during the prolonged use thereof. Furthermore, this type of printing ink has a disadvantage that it is impossible to conduct soldering.

Therefore it is a principal object of this invention to provide a printing ink for printed electric circuits which requires a lower baking temperature and is stable in its performance for a prolonged period of time.

Another object of this invention is to provide a printing ink for printed electric circuits which can be effectively soldered.

Still another object of this invention is to provide a printed circuit having an excellent base and printed circuits thereon which are stable for a prolonged period of time and which can be effectively soldered.

Other objects of this invention will become apparent from the following description.

We have now found that the various drawbacks encountered in the conventional printing inks are overcome and the above mentioned objects of this invention are accomplished when polybenzimidazole is used as a binder or vehicle for a printing ink for use in making printed electric circuits.

Thus, an improved printing ink for printed electric circuits comprises polybenzimidazole, a solvent therefor and an electric resistive material (e.g. carbon, platinum, palladium, AgO, PdO, etc.) or an electric conductive material (e.g. silver, gold, etc.).

The polybenzimidazole is a polymer of benzimidazole and already known in the art as a heat-resistant synthetic resin and therefore no detailed explanation thereabout will be required. Generally the degradation temperature of the polymer as determined by thermogravimetric analysis is about 450°C. (in air). Further, the inherent viscosity of polybenzimidazoles is 0.6–2.0 as 0.5 g./100 c.c. solution in dimethylacetamide.

In preparing the printing ink, the polybenzimidazole is dissolved in an organic solvent. Examples of solvents which may be used are dimethylacetamide, dimethylformamide, dimethylsulfoxide, N-methylpyrrolidone, etc. of a mixture of two or more of them. If desired, a suitable diluent such as isopropanol may be used. The concentration is not critical so far as the resulting printing ink can be effectively printed on a base. Generally, 1 to 40 (preferably 8 to 20) parts by weight of the polymer is dissolved in 100 parts of the solvent.

According to the invention, an electric conductive material or electric resistive material in finely divided form is suspended in the above prepared binder or vehicle (an organic solvent solution of polybenzimidazole). Any conventional electric conductive or resistive material well known in the art may be used. Thus, for example, carbon, platinum, palladium, AgO, PdO, etc. may be used as electric resistive material, and silver, gold, etc. may be used as electric conductive material. In any case, these materials are used in finely divided form or in powder form. As will be easily understood, when an electric conductive material is used the resulting printing ink would be useful for making electric conductive circuits, while when an electric resistive material is used the resulting printing ink would be useful for making electric resistive circuits. The amount of the electric conductive or resistive material may vary depending upon the desired electric characteristics of the circuits to be produced. However, generally, the electric conductive or resistive material is used in an amount of 5 to 10,000 parts by weight based on 100 parts by weight of the polymer.

It is preferable to incorporate an inorganic filler, particularly in case of electric resistive printing ink. Such inorganic filler useful in increasing the electric resistance. Thus, by varying the amount of the filler, the electric resistance of the resulting electric circuit may be varied. Further advantage of the use of inorganic filler is that the consistency or viscosity of the printing ink may be varied or controlled thereby. Examples of inorganic fillers which may used in this invention are silica, asbestos, alumina, etc. in finely divided form. As mentioned above, the amount of the filler may vary over a wide range depending upon the desired viscosity of the printing ink and also upon the electric characteristics desired in the resulting electric circuit. Generally the inorganic filler may be used in an amount of 1 to 1,000 parts by weight per 100 parts by weight of polymer.

The printing ink of this invention is generally in the form of paste and may be applied (printed) in a desired pattern onto the surface of a base in a conventional manner. After printing, the printed circuits are dried to remove the solvent. Then the printed circuits are fixed by being heated or baked at a temperature of about 150°–250°C., preferably 160°–200°C. Since the polybenzimidazole is excellent in adhesiveness, toughness and stability against heat, the resulting printed circuits are firmly bonded on the surface of the base, not damaged even when subjected to external force such as shock, compression, etc., and are stable in use for a prolonged period of time. Further, while the baking may be conducted at a moderate temperature (e.g. 160°–200°C.), the resulting circuit is excellent in its characteristics comparable to conventional ones where extreme high temperature baking is required. Further, the electric circuits obtained by the use of printing ink of this invention can be subjected to soldering.

As for the base for the printing circuit, any conventional one may be used. Thus, not only ceramic but also insulative synthetic resin-made base may be used because the heat treatment or baking may be conducted at such moderate temperature as 160°–200°C. Since these base materials for carrying printing circuits are well known in the art no detailed explanation thereabout would be required. However, it is most preferable to employ a base made of or having a layer of polybenzimidazole in order to further improve the firm bonding of the printed circuits with the base and also to improve the characteristics of the base itself.

Figure 2:
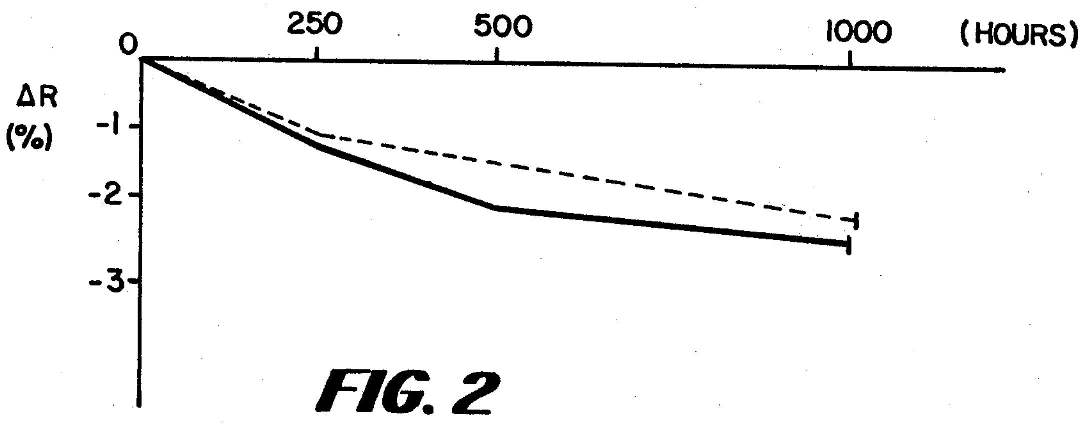

The invention will be further explained by means of the following Examples which are given for illustration purpose and which are made partly by referring to the accompanying drawings wherein:

FIG. 1 is a graph showing temperature coefficient of resistance of a circuit of this invention as compared with conventional one; and FIG. 2 is a graph showing load life stability of a circuit of this invention as compared with conventional one.

EXAMPLE 1

There were dissolved 10 parts by weight of poly-(2,2′-methaphenylene-5,5′-bibenzimidazole) in 40 parts by weight of dimethylacetamide and the resulting solution was further diluted with 20 parts by weight of isopropanol. Ten parts by weight of this polymer solution was well mixed with 2 parts by weight of finely divided active carbon to prepare a pasty printing ink for making low resistivity electric circuits. The sheet resistivity thereof was 100 Ω/□ .

EXAMPLE 2

There were dissolved 10 parts by weight of poly-(2,2′-methaphenylene-5,5′-bibenzimidazole) in 40 parts by weight of dimethylacetamide and the resulting solution was further diluted with 20 parts by weight of isopropanol. Ten parts by weight of the polymer solution were well mixed with 5 parts by weight of colloidal silver to prepare a pasty printing ink for making electric conductive circuits.

Each of the printing inks obtained in Examples 1 and 2 was applied (printed) in a predetermined circuit pattern onto the surface of a base (epoxy-glass laminate) and air-dried at room temperature for 5 minutes and then heat-treated at 100°C. for 15 minutes at 150°C. for further 15 minutes and at 200°C. for further 30 minutes to fix the printed circuits. The resulting conductive circuits could be effectively soldered. The electric resistive circuits showed excellent electric characteristics as indicated by dotted lines in FIGS. 1 and 2.

EXAMPLE 3

There were dissolved 10 parts by weight of poly-(2,2′-methaphenylene-5,5′-bibenzimidazole) in 40 parts by weight of dimethylacetamide and the solution was further diluted with 20 parts by weight of isopropanol or N,N,N′,N″,N″ hexamethyl phosphoric triamide. Ten parts by weight of this polymer solution were well mixed with 2 parts by weight of finely divided active carbon and 0.20 part by weight of silica powder (Trade Name: AEROSYL) to prepare a pasty printing ink for making high resistivity electric circuits. The sheet resistivity was 10 kΩ/□ .

EXAMPLE 4

There were dissolved 10 parts by weight of poly-(2,2′-methaphenylene 5,5′-bibenzimidazole) in 40 parts by weight of dimethylacetamide and the solution was further diluted with 20 parts by weight of isopropanol. Ten parts by weight of this polymer solution were well mixed with 5 parts by weight of colloidal gold powder to prepare a pasty printing ink for making electric conductive electric circuits.

Each of the printing inks obtained in Examples 3 and 4 was applied or printed in a predetermined circuit pattern onto the surface of a base i.e. polybenzimidazole-coated iron plate (iron plate coated by polybenzimidazole in the thickness of 0.2 mm) and air-dried at room temperature for 5 minutes, and then heat-treated at 100°C. for 15 minutes, at 150°C. for further 15 minutes and finally at 200°C. for 30 minutes to fix the printed circuits. The thus prepared electric resistive circuits showed excellent characteristics as in Example 1. Further, thus prepared electric conductive circuits could be effectively soldered.

COMPARATIVE EXAMPLE 1

A commercial printing ink for making electric resistive circuits and comprising palladium oxide powder, low melting glass powder, vehicle (ethyl cellulose) and solvent (Turpentine oil) was printed in a predetermined circuit pattern on the surface of a base (ceramic substrate) and heat-treated at 120°C. for 60 minutes to fix the printed circuits. The resulting circuits showed electric characteristics as indicated by solid lines in FIGS. 1 and 2.

COMPARATIVE EXAMPLE 2

The procedure of Comparative Example 1 was repeated except that a commercial printing ink for making electric conductive circuits and comprising metallic Ag powder, low melting glass powder, ethyl cellulose and turpentine oil was used. The resulting electric conductive circuits were subjected to soldering, but it was impossible to solder.

What we claim is:

1. A printed electric circuit comprising an insulative base, said base comprising a polybenzimidazole, and bonded thereto in a predetermined circuit pattern a printing ink composition comprising a polybenzimidazole matrix and an electric resistive or conductive material dispersed therein.

2. The printed electric circuit of claim 1 wherein an electric conductive material selected from the group consisting of silver and gold powder is dispersed in the polybenzimidazole matrix, the amount of said electric conductive material being from 500 to 10,000 parts by weight based on 100 parts by weight of the polybenzimidazole.

3. The printed electric circuit of claim 1, wherein an electric resistive material selected from the group consisting of carbon, platinum, palladium, AgO and PdO is dispersed in the polybenzimidazole matrix.

4. The printed electric circuit of claim 3, wherein the electric resistive material is carbon powder present in an amount of 5 to 500 parts by weight per 100 parts by weight of the polybenzimidazole.

5. The printed electric circuit of claim 3, wherein said composition further comprises an inert inorganic filler in finely divided form.

6. The printed electric circuit of claim 3 wherein said inert inorganic filler is silica, alumina or asbestos powder present in an amount of from 5 to 500 parts by weight per 100 parts of the polybenzimidazole.

* * * * *